(12) United States Patent
Mata et al.

(10) Patent No.: US 7,887,664 B1
(45) Date of Patent: *Feb. 15, 2011

(54) CONTINUOUS MOLDED EMITTER

(75) Inventors: John D. Mata, San Diego, CA (US); William C. Taylor, Jr., El Cajon, CA (US)

(73) Assignee: The Toro Company, Bloomington, MN (US)

( * ) Notice: Subject to any disclaimer, the term of this patent is extended or adjusted under 35 U.S.C. 154(b) by 1576 days.

This patent is subject to a terminal disclaimer.

(21) Appl. No.: 10/749,141

(22) Filed: Dec. 30, 2003

Related U.S. Application Data

(60) Provisional application No. 60/467,958, filed on May 5, 2003.

(51) Int. Cl.
B29C 47/00 (2006.01)

(52) U.S. Cl. .................. 156/244.11; 156/244.13; 156/244.22; 156/244.27; 156/203; 156/293; 239/11; 239/542

(58) Field of Classification Search ............ 156/244.11, 156/244.18, 244.24–244.27, 293, 303.1, 156/308.2, 309.6, 203, 244.13, 244.19; 239/542, 239/547

See application file for complete search history.

(56) References Cited

U.S. PATENT DOCUMENTS

| | | |
|---|---|---|
| 4,572,756 A | 2/1986 | Chapin |
| 4,642,152 A | 2/1987 | Chapin |
| 4,722,759 A | 2/1988 | Roberts et al. |
| 4,756,339 A | 7/1988 | Buluschek |
| 4,880,167 A | 11/1989 | Langa et al. |
| 5,022,940 A | 6/1991 | Mehoudar |
| 5,123,984 A | 6/1992 | Allport et al. |
| 5,252,162 A | 10/1993 | Delmer |
| 5,282,578 A | 2/1994 | De Frank |
| 5,282,916 A | 2/1994 | Bloom |
| 5,310,438 A | 5/1994 | Ruskin |
| 5,318,657 A | 6/1994 | Roberts |
| 5,324,371 A | 6/1994 | Mehoudar |
| 5,324,379 A | 6/1994 | Eckstein |
| 5,333,793 A | 8/1994 | DeFrank |
| 5,364,032 A | 11/1994 | De Frank |
| 5,375,770 A | 12/1994 | Roberts |
| 5,387,307 A | 2/1995 | Roberts |
| 5,400,973 A | 3/1995 | Cohen |
| 5,458,712 A | 10/1995 | DeFrank |
| 5,522,551 A | 6/1996 | DeFrank et al. |
| 5,584,952 A | 12/1996 | Rubenstein et al. |

(Continued)

FOREIGN PATENT DOCUMENTS

WO    WO 99/02273    1/1999

OTHER PUBLICATIONS

Israeli Patent Application No. 91571, entitled "Drip Irrigation Line and Method of Making Same", filed Sep. 8, 1989.

*Primary Examiner*—Dinh Q Nguyen
(74) *Attorney, Agent, or Firm*—IPLM Group, P.A.

(57) ABSTRACT

An irrigation hose (10) includes a continuous strip member (27). The continuous strip member (27) is formed by extruding a substrate (20) and allowing the substrate (20) to cool. Then a flow path (25) is extruded on the substrate (20). The continuous strip member (27) is then operatively connected to the inner wall 10a of the irrigation hose (10).

12 Claims, 5 Drawing Sheets

U.S. PATENT DOCUMENTS

| | | | | |
|---|---|---|---|---|
| 5,591,293 A * | 1/1997 | Miller et al. | ........... | 156/244.13 |
| 5,615,838 A | 4/1997 | Eckstein et al. | | |
| 5,620,143 A | 4/1997 | Delmer et al. | | |
| 5,634,595 A | 6/1997 | DeFrank et al. | | |
| 5,673,852 A | 10/1997 | Roberts | | |
| 5,676,897 A | 10/1997 | Dermitzakis | | |
| 5,695,127 A | 12/1997 | Delmer et al. | | |
| 5,722,601 A | 3/1998 | DeFrank et al. | | |
| 5,732,887 A | 3/1998 | Roberts | | |
| 5,744,779 A | 4/1998 | Buluschek | | |
| 5,785,785 A | 7/1998 | Delmer et al. | | |
| 5,855,324 A | 1/1999 | DeFrank et al. | | |
| 5,865,377 A | 2/1999 | DeFrank et al. | | |
| 5,957,391 A | 9/1999 | DeFrank et al. | | |
| 6,015,102 A | 1/2000 | Daigle et al. | | |
| 6,039,270 A | 3/2000 | Dermitzakis | | |
| 6,116,523 A | 9/2000 | Cabahug et al. | | |
| 6,120,634 A | 9/2000 | Harrold et al. | | |
| 6,371,390 B1 | 4/2002 | Cohen | | |
| 6,382,530 B1 * | 5/2002 | Perkins | ........... | 239/542 |
| 6,513,734 B2 * | 2/2003 | Bertolotti et al. | ........... | 239/542 |
| 6,561,443 B2 | 5/2003 | Delmer | | |
| 6,736,337 B2 * | 5/2004 | Vildibill et al. | ........... | 239/542 |
| 6,772,496 B1 | 8/2004 | Buluschek | | |
| 6,886,761 B2 | 5/2005 | Cohen | | |
| 6,945,476 B2 | 9/2005 | Giuffre | | |
| 2005/0258279 A1 * | 11/2005 | Harrold | ........... | 239/542 |

* cited by examiner

CONTINUOUS MOLDED EMITTER

This application claims the benefit of provisional application Ser. No. 60/467,958 filed May 5, 2003, entitled "Continuous Molded Emitter".

BACKGROUND OF THE INVENTION

1. Field of the Invention

This invention relates generally to irrigation hose, and more particularly to an irrigation hose having an elongate continuous molded emitter extruded on a substrate.

2. Description of the Prior Art

Agricultural irrigation systems in use today are predominantly flood and sprinkler systems. These systems have numerous shortcomings, including inefficient use of water and fertilizers, high labor and energy costs, pollution of surface and ground waters, and poor uniformity of water application on steep or uneven terrain.

Drip irrigation systems are being developed and adopted to address the above-noted problems. There are two major types of drip irrigation systems currently in use. The first involves use of discrete emitters installed either internally (In-Line) or externally (On-Line) to the hose. These emitters have passageways through which the water must pass, thereby regulating the water flow rate through the emitter. Such emitters may be pressure-compensating or non-pressure-compensating.

Another type of drip irrigation system employs a hose having a continuous emitter such as the Aqua-TraXX® hose of The Toro Company. Such hose includes the use of a continuous non-elastic strip which, in conjunction with the hose, forms a plurality of emitters. Perforations are then formed in the outside surface of the hose into the outlet of the emitter. During the production of such a hose, the flow path is extruded as a bead and goes to a rotary mold (two wheels) where it is formed into a flow path. The flow path then is placed in the hose as the hose is extruded. The speed at which the flow path may be extruded is limited. As higher speeds, since the flow path relies on its own structural integrity as it is coming out of the rotary mold, it cannot be extruded as fast as desired or the flow path will loose its definition and not be as effective as an emitter.

The present invention addresses the problems associated with the prior art devices and provides for an improved hose and method of making the hose utilizing a continuously molded emitter.

SUMMARY OF THE INVENTION

In one embodiment, the invention is a method of making an irrigation hose. The method includes extruding a substrate, at a first temperature, and allowing the substrate to cool to a second temperature. A continuous flow path is extruded. The flow path has a plurality of emitter units. The flow path is extruded on the substrate, thereby operatively connecting the flow path to the substrate to form a continuous strip member. A hose, having an inner wall, is extruded and the continuous strip member is operatively connected to the inner wall.

The invention also includes an irrigation hose made in accordance with this method.

In another embodiment, the invention is a method of making an irrigation hose. The method includes extruding a substrate at a first temperature and allowing the substrate to cool to a second temperature. The second temperature is less than 160° F. The substrate has a top surface and a bottom surface. The substrate has a thickness of from 0.002 inches to 0.020 inches. A continuous flow path is extruded on to the top surface of the substrate to form a continuous strip member. The flow path has a plurality of emitter units. A hose, having an inner wall, is extruded and the continuous strip member is operatively connected to the inner wall.

In another embodiment, the invention is a method of making a continuous strip member for use in making an irrigation hose. The method includes extruding a substrate at a first temperature and allowing the substrate to cool to a second temperature. A continuous flow path is extruded on to the substrate. The flow path has a plurality of emitter units. The flow path is thereby operatively connected to the substrate to form a continuous strip member. The continuous strip member is accumulated. The accumulated continuous strip member is then stored for subsequent use in forming an irrigation hose.

In another embodiment, the invention is an irrigation hose. The hose has a wall having an inner surface and an outer surface. A continuous strip member is operatively connected to the inner surface. The continuous strip member includes a substrate and a plurality of emitter units formed on the substrate. The emitter units have an inlet, flow regulating section and an outlet. An aperture if formed in the wall proximate the outlet, wherein water flowing through the hose enters the emitter units through the inlet and exists through the aperture.

In another embodiment the invention is a method of making an irrigation hose. The method includes extruding a substrate at a first temperature and allowing the substrate to cool to a second temperature. A continuous flow path is extruded. The flow path has a plurality of emitter units. The continuous flow path is extruded onto the substrate, thereby operatively connecting the flow path to the substrate to form a continuous strip member. A hose is extruded having an inner wall and the continuous strip member is operatively connected to the inner wall.

In another embodiment the invention is a method of making a continuous strip member for use in making an irrigation hose. The method includes extruding a continuous flow path, the flow path having a plurality of emitter units. The continuous strip member is accumulated and stored for subsequent use in forming an irrigation hose.

DETAILED DESCRIPTION OF A PREFERRED EMBODIMENT

Figure 1:
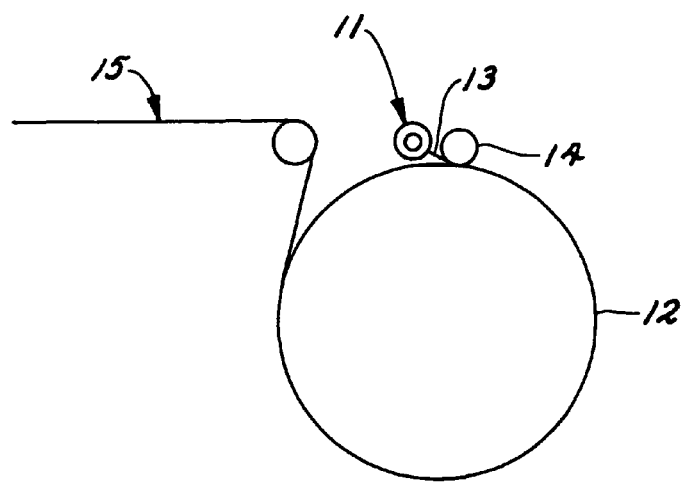
FIG. 1 is a schematic representation of the prior art.

Referring to the drawings, wherein like numerals represent like parts throughout the several views, there is generally disclosed at 10 an irrigation hose. The method of making an extruded flow path for use in an irrigation hose is shown generally in FIG. 1. There, a mold wheel extruder 11 extrudes a bead of plastic material on to a mold wheel 12. The bead of material 13 is positioned on the mold wheel 12 between the mold wheel 12 and another wheel 14. The completed flow path 15 is then formed between the wheels 12 and 14. The completed flow path 15 comes off of the mold wheel 12 and is then positioned inside of the die that is extruding the hose, thereby making an irrigation hose having a continuous flow path. The mold wheel 12 and wheel 14 form a plurality of individual emitter segments on the flow path 15, as is well known in the art. However, the flow path 15 will lose its definition if the flow path 15 is too hot and is susceptible to stretching. This constraint limits the speed at which the flow path 15 may be extruded. Existing flow paths 15 are generally extruded at an average of approximately 170 feet per minute. The flow path 15 is cooled as it moves around the mold wheel 12. The temperature at which the bead of material 13 is extruded is approximately 390 degrees F. When the completed flow path 15 comes off of the mold wheel 12, the temperature is approximately 100-140 degrees F.

Figure 2:
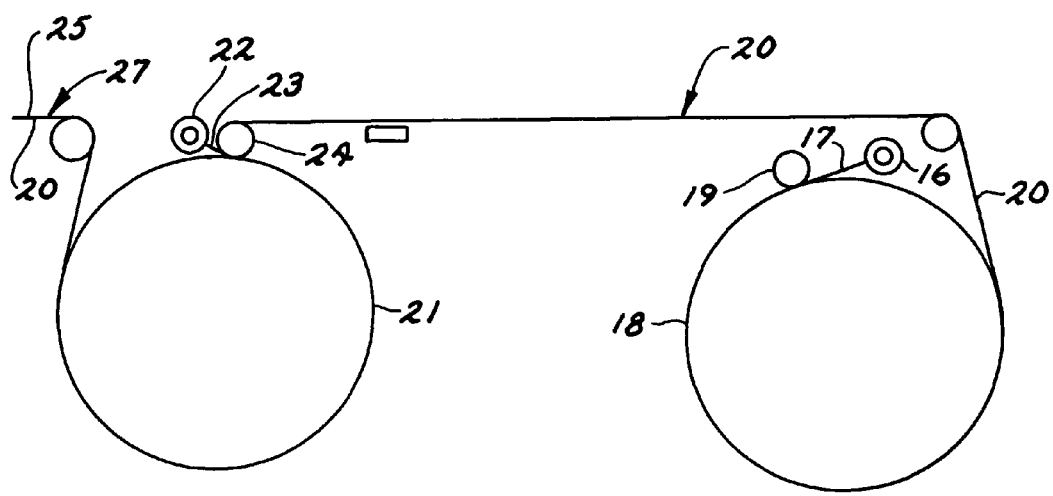
FIG. 2 is a schematic view of the present invention.
Figure 3:
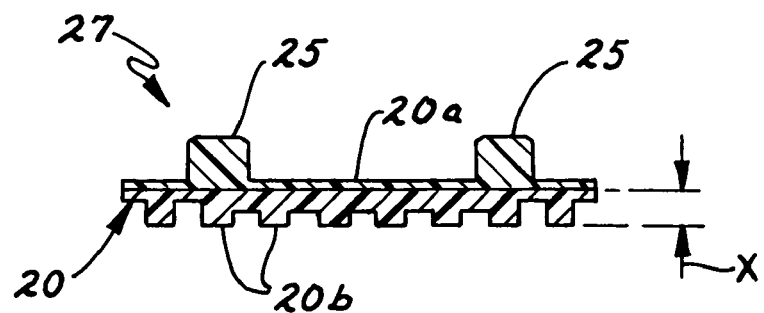
FIG. 3 is a cross-sectional view of the flow path formed in accordance with the present invention.

The irrigation hose 10 of the present invention is made in accordance with the method shown in FIG. 2. A substrate mold extruder 16 extrudes a bead of material 17 on to a substrate wheel 18. The beaded material passes between a second wheel 19 and the substrate wheel 18 and forms a substrate 20. The bead of material 17 is extruded at approximately 380° F. and is formed from a suitable material such as LLPE. The substrate 20 will have a width which is sufficient to accommodate and support a flow path. The substrate 20 has an overall thickness of approximately 0.014 inches. This thickness is represented by X in FIG. 3. A plurality of fins 20b are formed in the substrate 20 to provide for additional heat transfer. The top surface 20a is planar and is adapted to receive the flow path, as will be described more fully hereafter. The substrate 20 is then transferred to the mold wheel 21 and the mold wheel extruder 22. The mold wheel extruder extrudes a bead of material 23 on to the top surface 20a of the substrate 20. At this point, the substrate 20 has cooled to approximately 120° F. The bead of material 23, on top of substrate 20, then passes between a second wheel 24 and the mold wheel 21. During this process, the bead of material 23 is formed into a suitable flow path 25 having a suitable configuration, as is well known in the art. The configuration would include water inlets, flow regulating means, an outlet and other suitable flow path elements. The bead of material 23 is any suitable material such as LLPE, the same as the substrate 20. However, it is understood that other materials may also be utilized. The flow path 25 may also be of a different material than the substrate 20. By extruding the bead of material 23 on the substrate 20, it is possible to make the laminate of the continuous strip member 27, which is completed flow path 25 and substrate 20, at a speed higher than the completed flow path of the prior art. The flow path 25 is formed on a cooler substrate 20 and therefore does not have to rely on its own structural strength alone, but also can rely on the structural strength of the substrate 20, and therefore can be done at higher speeds. Line speed increases of at least 100 percent are possible using the present invention. Further, the flow path 25 is able to be molded with more definition utilizing the present invention.

Figure 4:
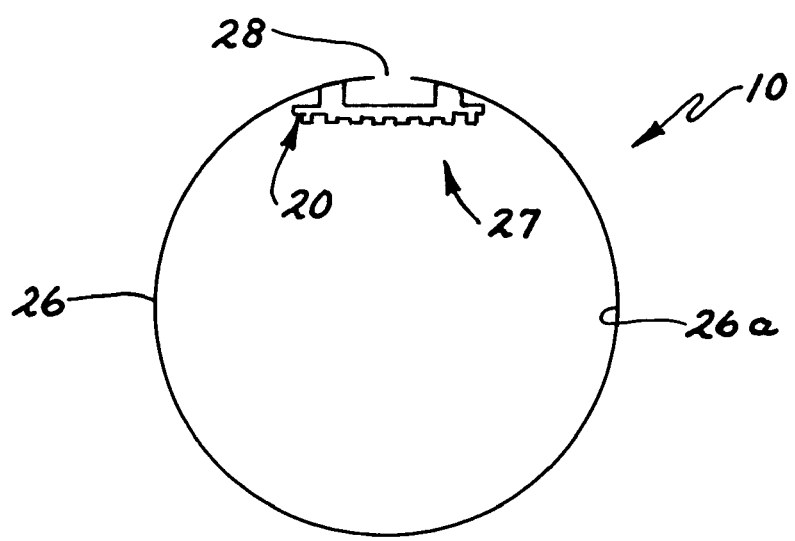
FIG. 4 is a view showing the flow path inserted in an irrigation hose.

FIG. 4 shows the lamination of the substrate 20 and flow path 25 in a hose 26, thereby forming the irrigation hose 10. The hose 26 has an inner wall 26a and forms the main water passageway through the hose 10. The continuous strip member 27 is laminated to the hose 26 in a manner similar to the known process of laminating the flow path 15 of the prior art. The continuous strip member may be rolled up and stored for later insertion into the hose 10. Alternately, the continuous strip member 27 may go right from the mold wheel 21 to the extruder for the hose. That is, the lamination of the flow path 25 and substrate 20 from the mold wheel 21 is positioned inside of the die head extruding the hose 26 thereby forming the irrigation hose 10. Suitable inlets (not shown) allow passage of water from the main water passageway into the emitter through the flow path. Suitable outlets 28 are formed in the irrigation hose 10 above the outlet section of the flow path 25, by means well known in the art.

Figure 5:
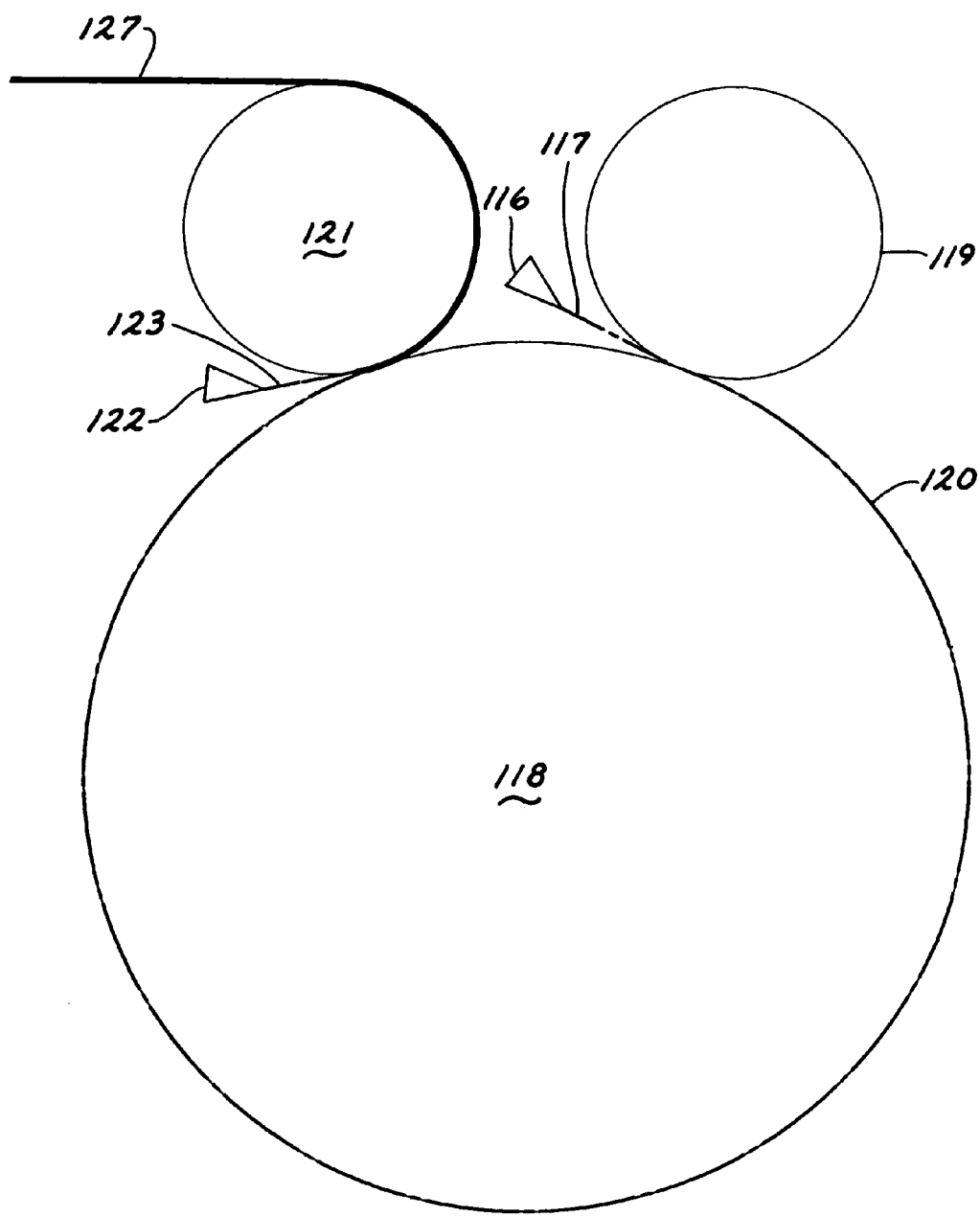
FIG. 5 is a schematic view of another method according to the present invention.

FIG. 5 is a schematic representation of another method of carrying out the present invention. A substrate mold extruder 116 extrudes a bead of material 117 on to a substrate wheel 118. The bead of material 117 passes between a second wheel 119 and the substrate wheel 118 to form a substrate 120. The bead of material 117 is extruded at approximately 380° F. and is formed from a suitable material such as LLPE. The substrate 120 will have a width which is sufficient to accommodate and support a flow path. A substrate 120 has an overall thickness of approximately 0.14 inches. This thickness is represented by X' in FIG. 8. The top surface 120a is planar and is adapted to receive the flow path, as will be described more fully hereafter. The substrate 120 is then positioned under a second extruder 122. The second extruder 122 extrudes a bead of material 123 on to the top surface 120a of the substrate 120. At this point, the substrate 120 has cooled to approximately 120° F. The bead of material 123 on top of the substrate 120, then passes between the substrate wheel 118 and a mold wheel 121. During this process, the bead of material 123 is formed into a suitable flow path 125 having a suitable configuration, as is well known in the art, and will be described more fully with respect to FIGS. 6-8. The bead of material 123 is any suitable material such as LLPE, the same as the substrate 120. However, it is understood that other materials may also be utilized. The flow path 125 may also be of different material than the substrate 120. By extruding the bead of material 123 on top of the substrate 120, it is possible to laminate the continuous strip member 127, which is the completed flow path 125 and substrate 120, at a speed higher than the completed flow path of the prior art. The flow path 125 is formed on the cooler substrate 120 and therefore does not have to rely on its own structural length alone, it can also rely on the structural strength of the substrate 120, and therefore can be done at higher speeds.

Figure 6:
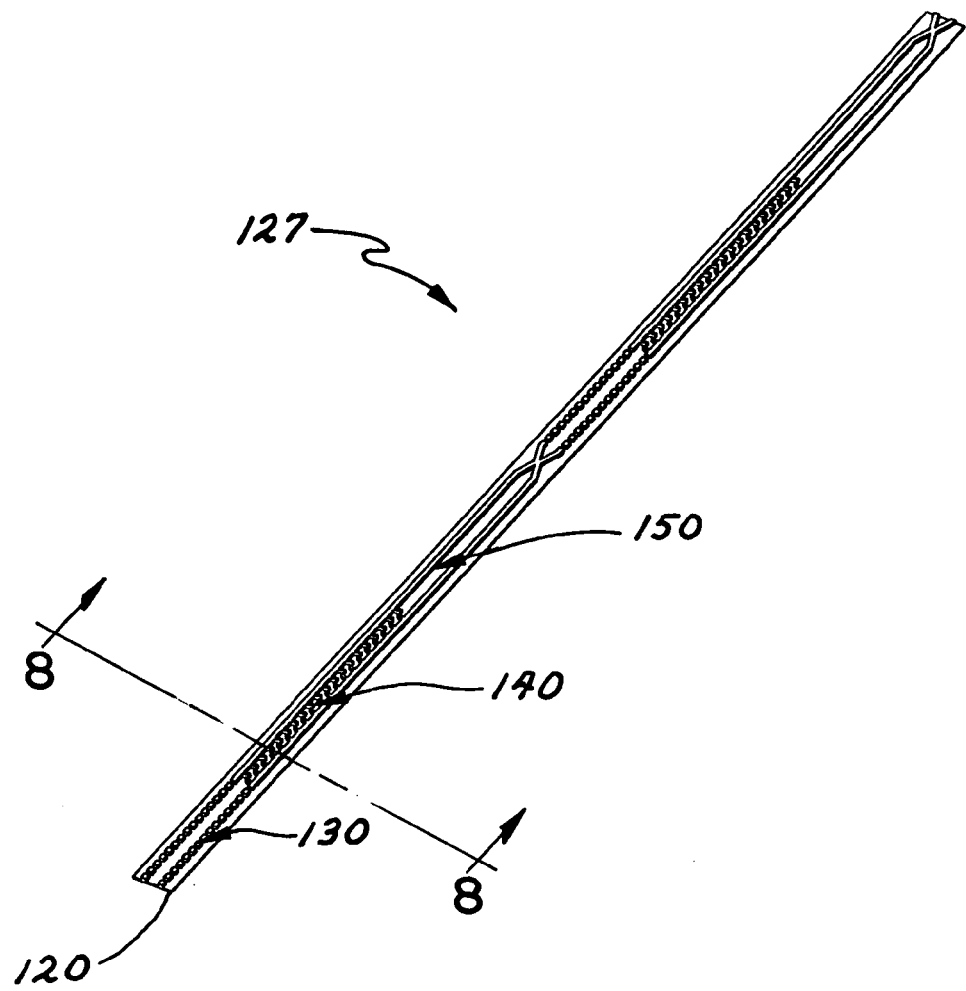
FIG. 6 is a perspective view of another embodiment of a continuous strip member.
Figure 7:
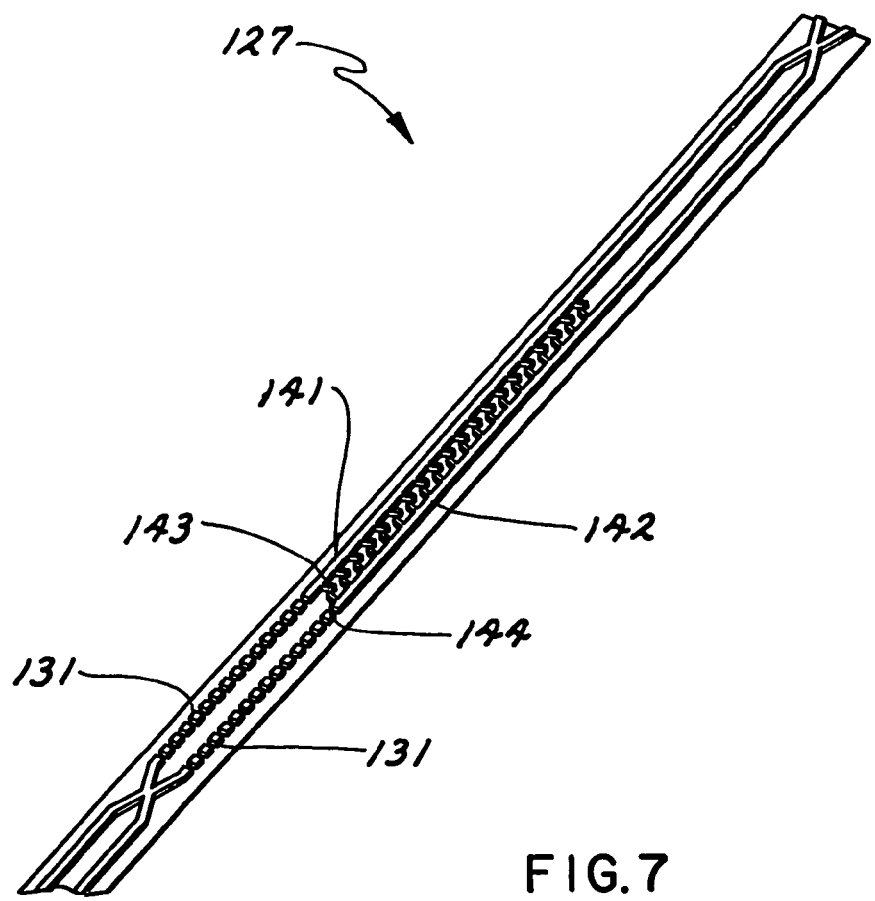
FIG. 7 is an enlarged perspective view of a portion of the continuous strip member shown in FIG. 6.
Figure 8:
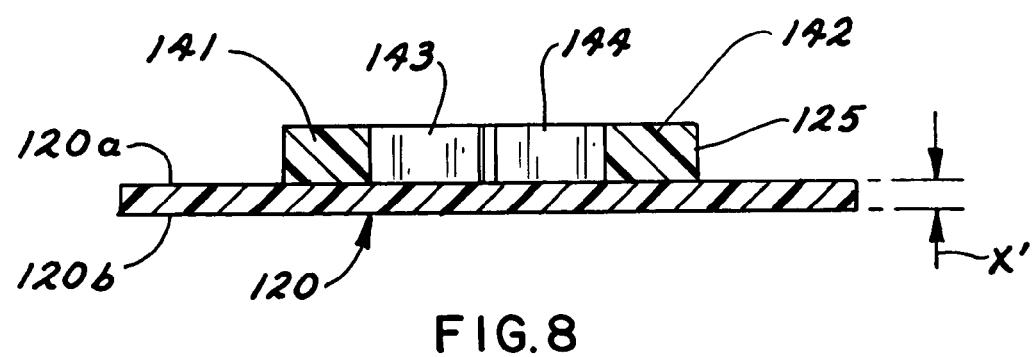
FIG. 8 is a cross sectional view of the continuous strip member taken generally along the lines 8-8 in FIG. 6.

Referring now to FIGS. 6-8, there is shown a continuous strip member 127. The continuous strip member 127 includes the substrate 120, having a top surface 120a and a bottom surface 120b. As compared to the substrate 20, the substrate 120 does not have the fins to aid in heat transfer, although it is understood that fins or other protrusions may be formed to aid in the transfer or removal of heat. The flow path 125 is shown in more detail than the flow path 25. As compared to FIG. 3, the flow path 25 extends across the entire top surface 20a, as viewed in FIG. 3. The bottom of the flow path 125 is so thin that it is not seen in the cross section in FIG. 8. The flow path 125 has an inlet section generally designated at 130, a flow regulator section generally designated at 140 and an outlet chamber generally designated at 150. The inlet section 130 includes a plurality of rectangular members 131 which allows water to enter from the interior of the hose 10 into the emitter unit of the continuous strip member 127. FIG. 6 shows two emitter units, while the enlargement in FIG. 7 shows only one. A pair of side members 141, 142 extend the length of the emitter unit and are generally in alignment with the rectangular members 131. The continuous strip member 127, when it is operatively connected to the inner wall 26a, is secured along the side members 141, 142 and the rectangular members 131. The flow regulating section 140 has two sets of chevrons 143, 144 that provide a tortuous path through which the water flows. The water then flows into the outlet chamber 150. An aperture 28 is formed in the hose 10 above the outlet chamber 150 to allow for water to exit the continuous strip member 127. The openings 28 are spaced along the length of the hose 10 above the outlet chambers 150 in the continuous strip emitter 127.

As previously described, after the continuous strip member 127 has been formed, it can be transported directly to another extruder that is extruding the hose 26. The continuous strip member 127 would be inside of the die of the extruder forming the hose. The continuous strip member is able to be formed at a higher speed, as previously indicated, thereby allowing for greater efficiencies.

In addition, another option is to accumulate, by rolling up or other suitable means, the continuous strip member 127 after it is formed. This allows for the later forming of the hose 10 or alternately shipping the continuous strip member 127 to other locations where the hose 10 may be completed. This allows for the high value or high tech portion of the hose 10, namely the continuous strip member 127, to be shipped at a much lower cost than the entire hose. Therefore, since the shipping of hose is an expensive portion of the overall costs, it is only necessary to have a facility that can extrude the hose at other locations throughout the country or the world and the continuous strip members 127 may be supplied from more central locations.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of making an irrigation hose, comprising:
   a) extruding a substrate at a first temperature, and allowing the substrate to cool to a second temperature;
   b) extruding a bead of material on the substrate;
   c) forming a flow path from the bead of material extruded on the substrate, having a plurality of emitter units, on the substrate, thereby operatively connecting the flow path to the substrate to form a continuous strip member;
   d) extruding a hose having an inner wall; and
   e) operatively connecting the continuous strip member to the inner wall.

2. The method of claim 1, wherein the substrate has a top surface and a bottom surface and the flow path is extruded on the top surface.

3. The method of claim 2, further comprising forming a plurality of protrusions on the bottom surface, whereby transfer of heat is enhanced.

4. The method of claim 1, wherein the second temperature is less than 160° F.

5. The method of claim 1, wherein the substrate has a thickness of from 0.002 inches to 0.020 inches.

6. A method of making an irrigation hose, comprising:
   a) extruding a substrate at a first temperature, and allowing the substrate to cool to a second temperature, the second temperature less than 160° F., the substrate has a top surface and a bottom surface, the substrate having a thickness of from 0.002 inches to 0.020 inches;
   b) extruding a bead of material on the substrate;
   c) forming a flow path from the bead of material extruded on the substrate, having a plurality of emitter units, on the top surface of the substrate to form a continuous strip member;
   d) extruding a hose having an inner wall; and
   e) operatively connecting the continuous strip member to the inner wall.

7. The method of claim 6, further comprising forming a plurality of protrusions on the bottom surface, whereby transfer of heat is enhanced.

8. A method of making an irrigation hose, comprising:
   a) extruding a substrate at a first temperature, and allowing the substrate to cool to a second temperature;
   b) extruding a bead material on the substrate;
   c) forming a flow path from the bead of material extruded on the substrate, having a plurality of emitter units, on the substrate, thereby operatively connecting the flow path to the substrate to form a continuous strip member; and
   d) operatively connecting the continuous strip member to an inner wall of a hose.

9. The method of claim 8, further comprising extruding a hose having an inner wall.

10. The method of claim 8, wherein the substrate has a top surface and a bottom surface and the flow path is extruded on the top surface.

11. The method of claim 8, wherein the second temperature is less than 160° F.

12. The method of claim 8, wherein the substrate has a thickness of from 0.002 inches to 0.020 inches.

* * * * *